United States Patent [19]

Iwaoka et al.

[11] 4,195,063
[45] Mar. 25, 1980

[54] CATALYST ELEMENT FOR CLEANING EXHAUST GASES

[75] Inventors: Kazuo Iwaoka; Tagao Toh, both of Toyonaka; Minoru Fukada, Kodoma, all of Japan

[73] Assignee: Matsushita Electric Industrial Co., Ltd., Osaka, Japan

[21] Appl. No.: 968,405

[22] Filed: Dec. 11, 1978

Related U.S. Application Data

[63] Continuation of Ser. No. 814,974, Jul. 12, 1977, which is a continuation-in-part of Ser. No. 794,115, May 5, 1977, which is a continuation of Ser. No. 605,395, Aug. 18, 1975, abandoned.

[30] Foreign Application Priority Data

| Sep. 3, 1974 | [JP] | Japan | 49-101516 |
| Sep. 3, 1974 | [JP] | Japan | 49-106251 |
| Dec. 20, 1974 | [JP] | Japan | 49-147488 |
| Jun. 2, 1975 | [JP] | Japan | 50-74986 |

[51] Int. Cl.² .................... F01N 3/15; B01J 8/02; B01J 35/04
[52] U.S. Cl. .................... 422/180; 252/477 R
[58] Field of Search .............. 252/477 R, 455 R; 423/212, 213.7; 422/171, 180, 181

[56] References Cited

U.S. PATENT DOCUMENTS

| 2,956,865 | 10/1960 | Williams, Sr. | 23/288 FC UX |
| 3,017,255 | 1/1962 | Norris | 60/302 X |
| 3,166,895 | 1/1965 | Slayter et al. | 23/288 FC X |
| 3,843,561 | 10/1974 | Sobel | 23/288 FC |
| 3,881,944 | 5/1975 | Beall et al. | 252/477 R X |
| 3,897,366 | 7/1975 | Nakamura et al. | 252/477 R |
| 3,925,252 | 12/1975 | Yabuta et al. | 23/288 FC X |
| 3,929,671 | 12/1975 | Nakamura et al. | 252/477 R |
| 3,949,109 | 4/1976 | McBride | 23/288 FC X |
| 3,989,471 | 11/1976 | Novak | 23/288 FC |
| 4,038,214 | 7/1977 | Gotoh et al. | 252/477 R |

FOREIGN PATENT DOCUMENTS

| 985055 | 3/1976 | Canada | 23/288 FC |
| 1014498 | 12/1965 | United Kingdom | 23/288 FC |

*Primary Examiner*—Michael S. Marcus
*Attorney, Agent, or Firm*—Burgess, Ryan and Wayne

[57] ABSTRACT

A cylindrical catalyst element comprising a heat-resistant metal in the form of a wire mesh or the like, a silica cloth supported by the mesh and having a catalyst disposed on a surface thereof adjacent the interior of the cylinder, said element being disposed adjacent the interior wall of an exhaust system upstream of a main catalyst device for cleaning the exhaust gases of an internal combustion engine.

3 Claims, 11 Drawing Figures

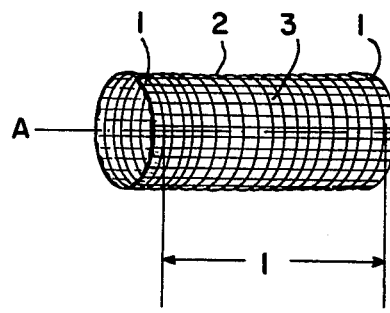
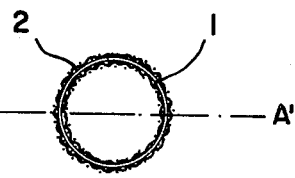
FIG.1(A)   FIG.1(B)
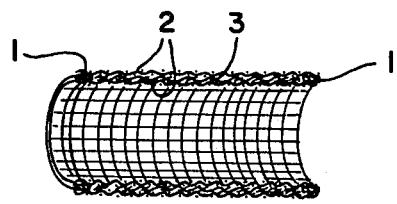
FIG.1(C)
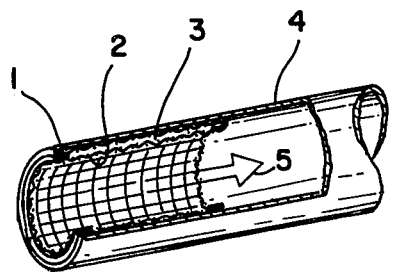
FIG.2

FIG.6
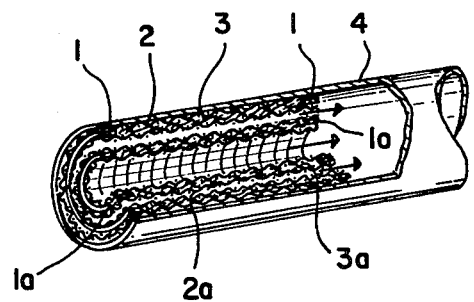
FIG.7(A) FIG.7(B)
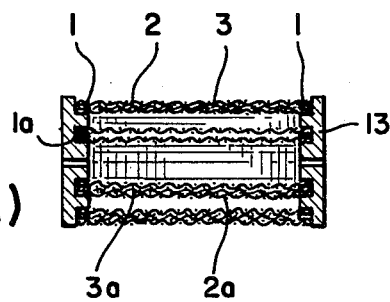 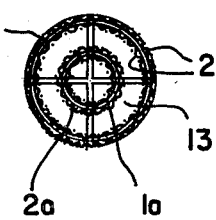
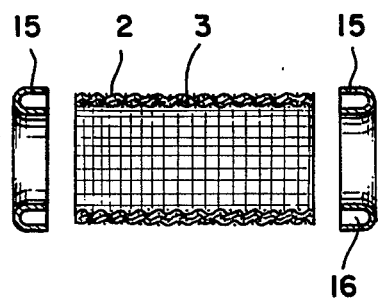
FIG.8

CATALYST ELEMENT FOR CLEANING EXHAUST GASES

This is a continuation, of application Ser. No. 814,974, filed July 12, 1977, which is a continuation-in-part of prior co-pending application Ser. No. 794,115 filed May 5, 1977, which is in turn a continuation of the parent application Ser. No. 605,395, filed Aug. 18, 1975, now abandoned.

BACKGROUND OF THE INVENTION

The present invention relates to a catalyst element for cleaning exhaust gases, and is particularly suitable for, but not limited to, a device for cleaning the exhaust gases of an internal combustion engine in cooperation with another exhaust gas cleaning device.

The exhaust gases discharged from internal combustion engines contain pollutants very harmful to human health, and their emission is limited by laws, orders and regulations. In general, the pollutants are carbon monoxide (CO), hydrocarbons (HC), nitrogen oxides (NOx) and so on, and in order to remove them, catalytic oxidation and reduction have been long used to convert them into carbon dioxide ($CO_2$), water ($H_2O$), nitrogen ($N_2$) and so on, and a wide variety of catalysts and catalyst type exhaust gas cleaning devices have been devised and demonstrated.

Heretofore, pellet, bead and monolithic type catalyst devices have been used for cleaning internal combustion engine exhaust gases. However, there is need for a catalyst device which exhibits flexibility, resistance to high temperatures, and which is simple in construction.

An object of the present invention is to provide an auxiliary catalyst element which is simple in construction yet very effective in removing pollutants in the exhaust gases of an internal combustion engine. Such an element may be placed upstream of a main catalytic type exhaust gas cleaning device (the "main catalyst") so that the combination of the main and auxiliary catalyst elements may provide a high exhaust gas cleaning rate while minimizing thermal degradation of the catalytic performance of said devices.

As herein described, there is provided a catalyst element for cleaning exhaust gases, comprising a heat resistant metal member having a cylindrical shape, a web of heat resistant inorganic fibers supported by said member, and a layer of catalyst material disposed on said web.

BRIEF DESCRIPTION OF THE DRAWINGS:

FIG. 1 shows the construction of an auxiliary catalyst element in accordance with the present invention, FIG. 1(A) being a perspective view thereof, FIG. 1(B) being a front view thereof and FIG. 1(C) being a cross sectional view thereof taken along the line A-A' of FIGS. 1(A) and 1(B);

FIG. 2 shows the auxiliary catalyst element as installed in an exhaust pipe with the wall thereof being partly cut out;

FIG. 6 is a perspective view with parts cut away of a double-/layer or -bed auxiliary catalyst device in accordance with the present invention;

FIGS. 7(A) and 7(B) are sectional and end views, respectively, of the device shown in FIG. 6; and FIG. 8 is a schematic view of retaining members adapted to firmly retain the ends of a cylindrical auxiliary catalyzer.

The same reference numerals are used to designate similar parts throught the figures.

DESCRIPTION OF THE PREFERRED EMBODIMENTS

Figure 3:
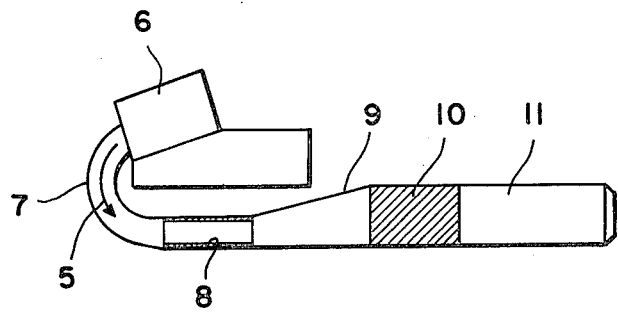
FIGS. 3, 4, and 5 show preferred embodiments, respectively, of the present invention, wherein each auxiliary catalyst element is disposed adjacent the interior wall of an exhaust system of a motorcycle.

In the present invention, catalysts carried by a silica cloth which is satisfactorily resistant to high temperatures and is quite flexible are used. (In this specification, the term "the silica cloth" refers to a silica cloth carrying the catalyst.) According to a preferred embodiment of the invention, the silica cloth is fabricated by bundling thousands of glass fibers about 6 to 13 microns in diameter into a thread and interweaving these threads into a cloth. The glass-fiber cloth is then immersed in a strong acid (preferably an inorganic acid such as hydrochloric acid, sulfuric acid or nitric acid, in a concentration of 30-97% by weight in aqueous solution), which is heated and is subjected to vibrations to extract alkali compounds from the glass fibers until the silica content thereof exceeds 90%. Thereafter, about 1 to 10% by weight of silica is attached to the cloth, and about 5 to 40% by weight of a mixture consisting of particles of compounds selected from a group consisting of alumina, zirconia, titania, magnesia and so on is attached to the silica cloth as carriers. Thereafter, preferably about 0.1 to 0.4% by weight of a catalyst or catalysts selected from a group consisting of noble metals such as platinum, palladium, lutecium, rhodium and so on is carried by the silica cloth.

The silica cloth catalyst may be made by including in the aforementioned process the steps of impregnating a sheet of silica cloth with a colloidal solution of alumina and silica, thereafter drying the silica cloth at about 100° C., sintering the dried cloth at about 550° C. to adhere about 15 to 17% by weight alumina-silica structure upon the silica cloth, and subsequently depositing about 0.1 to 0.4% by weight of platinum or another noble metal upon the sintered silica cloth.

In FIG. 1 there is shown an auxiliary catalyst element in accordance with the present invention consisting of two end rings 1 spaced apart from each other in the axial direction by 150 mm, a first or inner stainless wire mesh 2, a silica-cloth catalyst member 3 and a second or outer stainless wire mesh 2. The end rings 1 are made of, for instance, SUS 304 and are 1 mm in thickness, 5 mm in width and 48 mm in diameter, and the wire cloth or mesh 2 is made of, for instance, wire 0.4 mm in outer diameter and made of AISI 304, and is 20 mesh. The wire cloth 2 is wound in one turn around and between the end rings 1, and thereafter the silica-cloth catalyst member 3, cut to the width of 150 mm, is wound in two turns over the first or inner wire cloth 2 and is spot-welded to the end rings 1. Thereafter the wire cloth 2 of the type described above and previously cut to a width of 160 mm is wound in one turn over the catalyst member 3 and is spot-welded to the end rings 1.

The auxiliary catalyst element with the above construction may be placed within an exhaust pipe 4 (see FIG. 2) made of metal and 50 mm in inner diameter. Turbulent streams of exhaust gases 5 are brought into intimate contact with the catalyst element so that environmental pollutants may be converted into harmless compounds.

Figure 4:
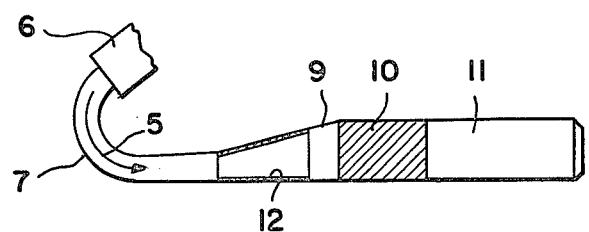
Figure 5:
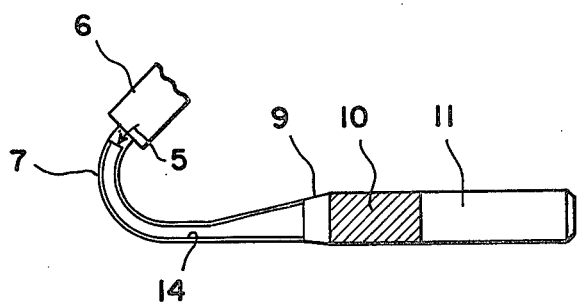

In the preferred embodiments shown in FIGS. 3, 4 and 5, an auxiliary catalyzer element with the above construction is placed upstream of a main catalyst 10 in an exhaust system of a motorcycle or the like. In the embodiment shown in FIG. 3, the exhaust gases discharged from an engine 6 flow through an exhaust pipe 7 into the main catalyst 10, and an auxiliary catalyst element 8, with the construction described in conjunction with FIG. 1, is placed within a straight pipe section 50 mm in diameter and interposed between the exhaust pipe 7 and the main catalyst 10 so that some of the pollutants in the exhaust gases are converted into harmless compounds by contact with the catalyst element 3 before entering the main catalyst 10 through a diverging or tapered pipe connection 9. In the main catalyst a substantial portion of the pollutants is converted into harmless compounds.

In the embodiment shown in FIG. 4, placed in the diverging pipe connection 9 and over its interior wall, is a frustoconical auxiliary catalyst element 12, 50 and 70 mm in diameter at an inlet opening and an outlet opening, respectively, and 150 mm in length.

In the embodiment shown in FIG. 5, disposed adjacent the interior walls of the exhaust pipe 7 and of the pipe connection 9 is an auxiliary catalyst element 14 consisting of a cylindrical section coextensive with the exhaust pipe 7 and a frustoconical section coextensive with the diverging pipe connection 9 from the position immediately downstream of an exhaust port of the engine 6 to the position immediately upstream of the intake opening of the main catalyst 10.

FIG. 6 is a perspective view of a double-layer of double-bed auxiliary catalyst element with parts being cut away to show the construction thereof; and FIGS. 7(A) and 7(B) are sectional and end views, respectively, thereof. An outer catalyst layer or bed is fabricated in a manner substantially similar to that described in conjunction with FIG. 1. That is, two end rings 1 are made of AISI 304, are 1 mm in thickness, 5 mm in width and 48 mm in outer diameter and are spaced apart from each other by 100 mm in the axial direction, and a stainless wire mesh or cloth of 20 mesh made of stainless wire 0.4 mm in diameter and made of SUS 304 is wound in one turn over and between the end rings 1 and is spot-welded to them. Thereafter a silica-cloth catalyst member 3 previously cut to a width of 100 mm is wound in two turns over the inner wire screen 2 and is firmly joined to the end rings 1 by spot-welding. Thereafter a 20 mesh stainless wire cloth cut to width of 110 mm is wound in one turn over the catalyst member 3 and is spot welded to the end rings 1.

An inner catalyst layer or bed is also fabricated in a manner substantially similar to that described above. That is, end rings 1a 1.0 mm in thickness, 5 mm in width and 30 mm in outer diameter are spaced apart from each other in the axial direction by 100 mm, and an 8 mesh stainless wire cloth 2a made of AISI 304 stainless wire 0.6 mm in gage is wound in one turn over the inner wire cloth 2 and is joined to the end rings 1a by spot welding. Thereafter a silica-cloth catalyst member 3a previously cut to a width of 100 mm is wound in two turns over the inner wire cloth 2a and is joined to the end rings 1a by spot welding. The end rings 1 and 1a of the outer and inner coaxial catalyst beds or layers are mounted on supporting rings 13 so that their spacing may be maintained constant.

In FIG. 8 there are shown retaining members 15 adapted to firmly retain the ends of a cylindrical assembly consisting of the stainless wire mesh or cloth 2 and the silica-cloth catalyst member 3. The retaining member is in the form of a ring 15 formed from a sheet of AISI 304 0.3 mm in thickness and is formed with an annular groove 16. The retaining rings 15 are fitted over the ends of the cylindrical catalyst assembly and are securely pressed against or joined to said ends by spot welding.

As described hereinbefore according to the present invention, the auxiliary catalyst element is used in combination with the main catalyst so that the following advantages may be attained:

1. The initial contact of the exhaust gases with the auxiliary catalyst element improves the exhaust gas cleaning rate during cold starting. That is, the temperature of the exhaust gases may be increased by the exothermic oxidation thereof in the auxiliary catalyst element, so that the cleaning reactions in the main catalyst may be enforced.

2. The auxiliary catalyst element decreased the quantity of pollutants to be converted into harmless compounds in the main catalyst, so that excessive temperature rise of the main catalyst may be avoided and consequently thermal degradation, may be avoided, with resultant long lifetime of the main catalyst thereof.

These and other advantages of the auxiliary catalyzer in accordance with the present invention are pronounced, especially when it is used in an exhaust system of a two-stroke engine which discharges exhaust gases containing a higher content of unburned hydrocarbons (HC) than a four-stroke engine, because the auxiliary catalyst element serves to lower the reaction temperature of the main catalyst placed downstream of the auxiliary catalyst element.

Tests were conducted with a two-stroke single-cylinder engine with a displacement of 250 cc in order to measure the reaction temperatures of the main catalyst with and without the auxiliary catalyst element, when the engine was driven in the LA-4 mode.* The maximum reaction temperature difference was 200° C.; i.e. the main catalyst operated up to 200° C. cooler when the auxiliary catalyst element of the invention was utilized. In addition the construction of the auxiliary catalyst element in accordance with the present invention provides the following advantages:

1. Fullest use of the advantages of the high-exhaust-gas-cleaning-ability, the high resistance to heat and the excellent flexibility of the silica cloth catalyst member.

2. The construction is extremely simple and the configurations may be varied to be fitted into any exhaust systems.

3. Mass production is possible so that the cost is inexpensive.

* As said mode is defined in the applicable United States Government test procedure.

So far the present invention has been described in conjunction with the preferred embodiments thereof, but it will be understood that the present invention is not limited there o. For instance other quantities of silica, alumina and zirconia attached to the silica-cloth than those disclosed may be utilized, and inorganic compounds may be equally used. In addition to platinum and rhodium, other noble metals such as iridium, palladium and latecium and other metallic catalysts may be used and if desired in different quantities than herein disclosed. In addition to AISI 304, any other suitable materials may be used, and the mesh of the wire cloth is not necessarily limited to 20 or 8. Furthermore, instead of stainless wire cloth, expanded metal or perforated steel sheets may be used.

What is claimed is:

1. In combination with a main exhaust gas catalytic element cleaning device, an auxiliary catalytic element cleaning device situated upstream of said main device, said auxiliary device comprising:

a generally cylindrical elongated exhaust pipe section;

a first inner generally cylindrical heat resistant metal mesh support;

a first outer generally cylindrical heat resistant metal mesh support coaxial with and spaced apart from said inner support;

said supports having shapes conforming to the interior surface of said exhaust pipe section, so that the external surface of said outer support is disposed in juxtaposition with said interior exhaust pipe surface;

a first web comprising a layer of heat resistant catalytic material disposed between and retained in position by said inner and outer supports;

a second inner generally cylindrical heat resistant metal mesh support;

a second outer generally cylindrical heat resistant metal mesh support coaxial with and spaced apart from said inner support;

said second supports being disposed within and coaxially spaced from said first supports, a second web comprising a layer of heat resistant catalytic material disposed between and retained in position by said second inner and outer supports;

a pair of end members secured to respective ends of said supports and to the interior surface of said exhaust pipe section, for maintaining said supports in alignment so that exhaust gases flow through said section in the longitudinal direction thereof in a path substantially confined to the internal surfaces of said first inner support, parallel to and in surface contact with interior surface portions of said first catalytic web and with both exposed surfaces of said second catalytic web, and means for connecting and communicating said auxiliary catalytic device with said main catalytic device.

2. The combination according to claim 1, wherein each of said mesh supports comprises a heat resistant metal and each of said webs comprises silica cloth having at least a 90% silica content, with a catalytic layer on each web comprising about 1 to 10% by weight of silica particles and about 5 to 40% by weight of particles of oxides of aluminum, zirconium, titanium and magnesium, and a noble metal catalyst disposed on each said layer.

3. The auxiliary device according to claim 1, wherein said catalytic material comprises silica cloth having at least 90% silica content by weight, and said metal supports comprise stainless steel.

* * * * *